US011789416B2

(12) United States Patent
Kulkarni et al.

(10) Patent No.: US 11,789,416 B2
(45) Date of Patent: *Oct. 17, 2023

(54) PROVIDING INTEGRATIVE COMFORT IN A STRUCTURE

(71) Applicant: Ademco Inc., Golden Valley, MN (US)

(72) Inventors: Amit Kulkarni, Plymouth, MN (US); Patrick Gonia, Maplewood, MN (US); David R Kaufman, Scottsdale, AZ (US)

(73) Assignee: Ademco Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,218

(22) Filed: Feb. 26, 2020

(65) Prior Publication Data
US 2020/0192309 A1   Jun. 18, 2020

Related U.S. Application Data

(63) Continuation of application No. 15/374,657, filed on Dec. 9, 2016, now Pat. No. 10,591,878.

(51) Int. Cl.
*G05B 15/02* (2006.01)

(52) U.S. Cl.
CPC ...... *G05B 15/02* (2013.01); *G05B 2219/2642* (2013.01); *Y02P 90/02* (2015.11)

(58) Field of Classification Search
CPC .............. G05B 19/042; G05B 19/048; G05B 2219/2642; G05B 15/02; F24F 11/006; F24F 11/0012; F24F 11/0034; F24F 11/0086; G05D 23/1917; G07C 9/00158
See application file for complete search history.

(56) References Cited

U.S. PATENT DOCUMENTS

| | | | |
|---|---|---|---|
| 9,814,117 B2 | 11/2017 | Loveland et al. | |
| 10,852,018 B1* | 12/2020 | Flora | F24F 11/61 |
| 2009/0065596 A1 | 3/2009 | Seem et al. | |
| 2010/0070089 A1* | 3/2010 | Harrod | F24F 11/30 |
| | | | 700/277 |

(Continued)

FOREIGN PATENT DOCUMENTS

| | | |
|---|---|---|
| CN | 102461337 A | 5/2012 |
| CN | 204406166 U | 6/2015 |

(Continued)

OTHER PUBLICATIONS

Prosecution History from U.S. Appl. No. 15/374,657, dated Mar. 28, 2018 through Feb. 10, 2020, 222 pp.

*Primary Examiner* — Alicia M. Choi
(74) *Attorney, Agent, or Firm* — Greenberg Traurig, LLP; Ryan D. Sharp; David J. Dykeman

(57) ABSTRACT

Methods, devices, and computer-readable media for providing integrative comfort a structure are described herein. One method includes determining a comfort preference associated with a user of a mobile device, the comfort preference including a plurality of aspects of physical comfort, storing the comfort preference in a memory, and modifying a respective operation of a plurality of connected devices in a portion of a structure to provide the comfort preference in the portion of the structure responsive to a distance between the mobile device and the portion of the structure being less than a particular threshold.

20 Claims, 3 Drawing Sheets

(56) References Cited

U.S. PATENT DOCUMENTS

| | | | |
|---|---|---|---|
| 2011/0016899 A1* | 1/2011 | Ogura | B60H 1/00278 |
| | | | 62/239 |
| 2012/0312520 A1* | 12/2012 | Hoke | B60H 1/00285 |
| | | | 165/203 |
| 2013/0234840 A1 | 9/2013 | Trundle et al. | |
| 2013/0307801 A1 | 11/2013 | Nam | |
| 2014/0098247 A1 | 4/2014 | Rao et al. | |
| 2014/0151456 A1 | 6/2014 | McCurnin et al. | |
| 2014/0266669 A1 | 9/2014 | Fadell et al. | |
| 2015/0116108 A1 | 4/2015 | Fadell et al. | |
| 2015/0195100 A1 | 7/2015 | Imes et al. | |
| 2015/0204561 A1 | 7/2015 | Sadwick et al. | |
| 2015/0204569 A1 | 7/2015 | Lorenz et al. | |
| 2016/0014108 A1 | 1/2016 | Chen et al. | |
| 2016/0018119 A1* | 1/2016 | Desmet | F24F 11/30 |
| | | | 165/237 |
| 2016/0072891 A1 | 3/2016 | Joshi et al. | |
| 2016/0095188 A1 | 3/2016 | Verberkt et al. | |
| 2016/0156764 A1 | 6/2016 | Mahasenan et al. | |
| 2016/0182703 A1 | 6/2016 | Khurana et al. | |
| 2016/0258209 A1* | 9/2016 | Berman | G05B 15/02 |
| 2017/0070842 A1 | 3/2017 | Kulp et al. | |
| 2017/0108235 A1 | 4/2017 | Guan et al. | |
| 2017/0123442 A1 | 5/2017 | Tsai et al. | |
| 2017/0191693 A1 | 7/2017 | Bruhn et al. | |
| 2017/0191695 A1* | 7/2017 | Bruhn | H04N 21/4227 |
| 2017/0195130 A1 | 7/2017 | Landow et al. | |
| 2017/0205105 A1 | 7/2017 | Adam et al. | |
| 2017/0370366 A1 | 12/2017 | Johnson et al. | |
| 2018/0107336 A1* | 4/2018 | Alberth, Jr. | G06F 3/0418 |
| 2018/0147676 A1* | 5/2018 | Havard, Jr. | F25B 41/20 |
| 2018/0164761 A1* | 6/2018 | Gonia | G05B 15/02 |
| 2018/0218787 A1* | 8/2018 | Park | A61B 5/0077 |
| 2018/0299150 A1* | 10/2018 | Ajax | F24F 11/0008 |
| 2019/0042855 A1* | 2/2019 | Sherry | H04N 21/84 |
| 2019/0268999 A1* | 8/2019 | Oobayashi | F24F 11/62 |
| 2021/0094380 A1* | 4/2021 | Faust | B60H 1/00064 |

FOREIGN PATENT DOCUMENTS

| | | | | |
|---|---|---|---|---|
| CN | 104865929 A | | 8/2015 | |
| CN | 105353794 A | | 2/2016 | |
| CN | 106154856 A | | 11/2016 | |
| JP | 2018007157 A | * | 7/2016 | H04Q 9/00 |
| WO | 2011022253 A3 | | 2/2011 | |
| WO | 2015/112877 A1 | | 7/2015 | |

* cited by examiner

| MODE 216 | SCENARIO DESCRIPTION 218 | TEMPERATURE (WARM, PLEASANT, COOL, COLD) 220 | HUMIDITY (DESERT, DRY, MILD, HUMID) 224 | AIRFLOW (STILL, AIRY, BREEZY, HURRICANE) 226 | AMBIENT LIGHT (DARK, SHADY, BRIGHT) 228 |
|---|---|---|---|---|---|
| | | STAT SET POINT, FIREPLACE ON/OFF, WINDOWS OPEN/CLOSED | HUMIDIFIER ON/OFF/SETPOINT, WINDOWS OPEN/CLOSED | FAN ON/OFF/SPEED, WINDOWS OPEN/CLOSED/PARTIAL, SHADES OPEN/CLOSED/PARTIAL | LIGHTS ON/OFF/LEVEL/COLOR, SHADES OPEN/CLOSED/PARTIAL, WINDOWS OPEN/CLOSED/PARTIAL |
| ICY | COMING HOME FROM HARD, HOT WORKOUT | COLD | DESERT | HURRICANE | DARK |
| COOL & CRISP | COMING HOME ON A HOT SUMMER DAY | COOL | DRY | BREEZY | SHADY |
| NORMAL | GATHERING OF FRIENDS & FAMILY | PLEASANT | MILD | AIRY | BRIGHT |
| COZY | CURLED UP FOR A MOVIE | WARM | MILD | STILL | DARK |
| TOASTY | WARMING UP ON A COLD DAY | WARM | HUMID | STILL | SHADY |

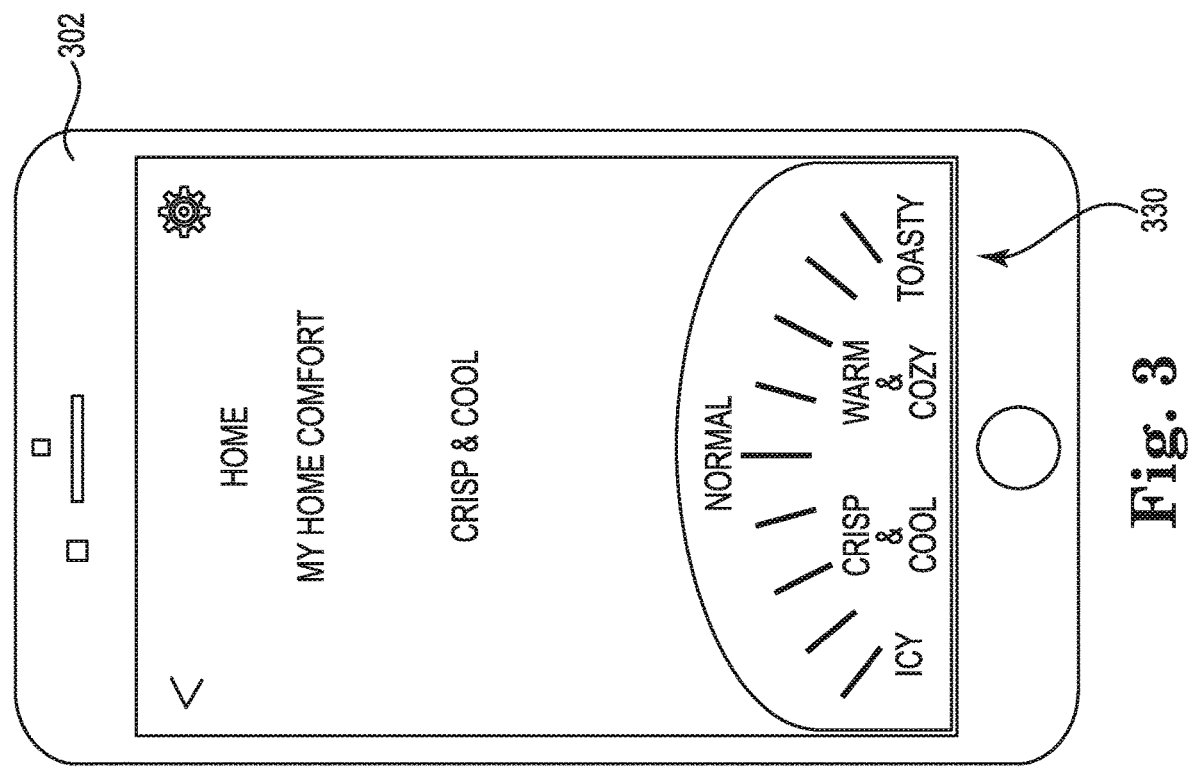

PROVIDING INTEGRATIVE COMFORT IN A STRUCTURE

This application is a continuation of U.S. application Ser. No. 15/374,657, filed on Dec. 9, 2016, the entire content of which is incorporated by reference herein.

TECHNICAL FIELD

The present disclosure relates to methods, devices, and computer-readable media for providing integrative comfort in a structure.

BACKGROUND

Structures (e.g., homes, hotels, motels, office buildings, etc.) contain devices designed to provide comfortable living conditions. Such devices can, for example, control temperature, lighting, ventilation, and/or humidity, among others. A person's comfort within a structure can include different operations of these devices depending on user preferences in various contexts.

Some previous approaches to providing comfort in a structure seek to control devices within the structure using one or more software applications ("apps"). In some approaches, each device can be controlled by its own app. In other approaches, an aggregator app can be used to control several devices.

In approaches where each device is controlled by a respective app, users may need to download a large number of such apps and individually configure them, leading to frustration. In approaches where a single app is used to control several devices, users may still need to adjust each device individually to provide a desired comfort preference. For example, a user's notion of comfort is not simply limited to changing the setpoint of a thermostat. Comfort can be defined by many variables, such as temperature, humidity, airflow, light levels, etc. Previous approaches where a single app is used to control several devices may not provide a mechanism to treat comfort in an integrative manner.

BRIEF DESCRIPTION OF THE DRAWINGS

FIG. 2 illustrates a table showing example comfort preferences and aspects thereof in accordance with one or more embodiments of the present disclosure.

FIG. 3 illustrates an example display of a mobile device for providing integrative comfort in a structure in accordance with one or more embodiments of the present disclosure.

DETAILED DESCRIPTION

Figure 1:
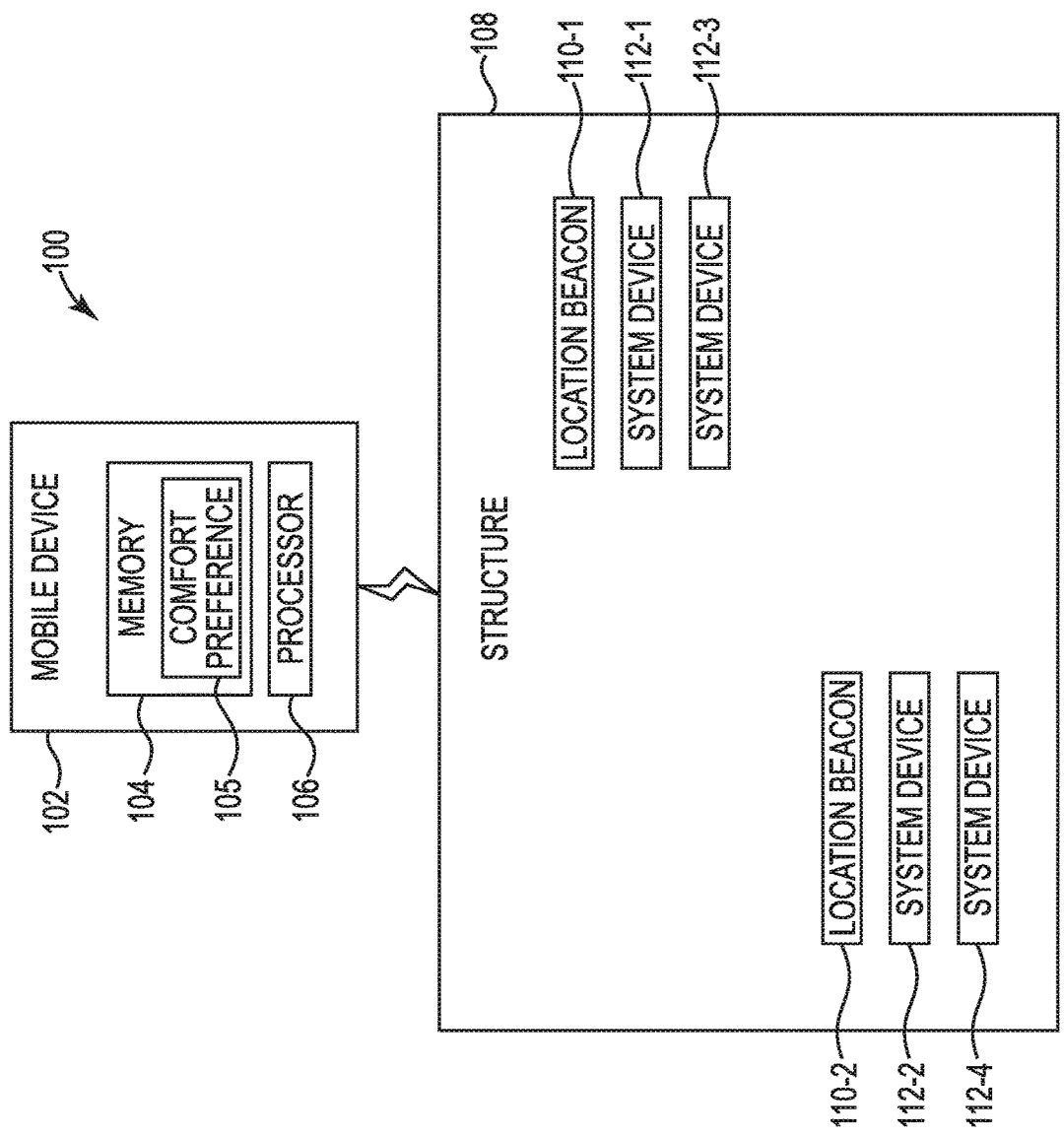
FIG. 1 illustrates a system for providing integrative comfort in a structure in accordance with one or more embodiments of the present disclosure.

Methods, devices, and systems for providing integrative comfort in a structure are described herein. For example, one or more embodiments include determining a comfort preference associated with a user of a mobile device, the comfort preference including a plurality of aspects of physical comfort, storing the comfort preference in a memory, and modifying a respective operation of a plurality of connected devices in a portion of a structure to provide the comfort preference in the portion of the structure responsive to a distance between the mobile device and the portion of the structure being less than a particular threshold.

Providing integrative comfort in accordance with one or more embodiments of the present disclosure can include allowing a device associated with a user, such as a mobile device, to interact with (e.g., modify one or more operations of) connected system devices in a structure rather than the user having to interact with the connected devices. Accordingly, embodiments herein can allow a user to make fewer inputs and/or adjustments than previous approaches in order to be provided with a desired comfort preference. In some embodiments, for instance, the user can select a predefined comfort preference with a single input (e.g., gesture).

Devices associated with a user, as referred to herein, include devices that are (or can be) carried and/or worn by the user. That is, integrative comfort in accordance with one or more embodiments of the present disclosure can be provided via the use of a carried and/or worn mobile device, such as a smart phone or wristband (e.g., watch). Accordingly, some embodiments of the present disclosure can be fully automated and implemented without any burden or change in behavior of the user.

Comfort preferences, as referred to herein, include one or more aspects of comfortable physical conditions for a given person (e.g., aspects of physical comfort). Providing a comfort preference can include providing a temperature, a lighting level, a ventilation (e.g., airflow) level, carbon dioxide level, an air scent, a sound level, and/or a humidity level, among other aspects. A person's comfort within a structure can include different operations of various connected devices (sometimes referred to as "system devices") depending on user preferences in various contexts. Embodiments of the present disclosure can adjust these devices automatically, in some embodiments, without the need for the user to adjust them one-by-one.

A person may have personal preferences associated with comfort (hereinafter referred to as "comfort preferences") that depend on context. Context, for instance, can include different locations of a structure. Comfort preferences may depend on the type of room or area of the structure. For example, a person may prefer a temperature to be set to 69 degrees Fahrenheit and an airflow to be set low if they are in a living room (e.g., watching television). The person may prefer a temperature to be set to 73 degrees Fahrenheit and an airflow to be set high if they are in a bathroom (e.g., entering a shower).

Additionally, a person may have different comfort preferences based on what the person is doing or has recently done. For example, a person who has returned home from (or is in the middle of) an intensive workout may desire a cool temperature, a low humidity, a high airflow, and a darkened lighting level. In contrast, a person coming in from a day spent outside in the winter may desire a warm temperature, a high humidity, a low airflow, and a moderate lighting level.

Preferences may also depend on time context (e.g., a time of day, a day of week, a time of year, etc.). For example, a person may prefer different lighting conditions inside during summer months in the afternoon than in winter months. Embodiments herein can determine a time context and provide a comfort preference based on the context.

Furthermore, preferences can change on a more subtle level as a person changes and/or adapts to his or her environment. For example, preferences can change as a person adapts to a particular location (e.g., region) and/or activity over a period of time. If a person moves from a colder climate to a hotter one, he may initially prefer temperature settings to be cooler in his home. After a period of time, however, he may adapt to the hotter climate and prefer the home to be somewhat warmer.

Similarly, if a person begins a daily program of vigorous exercise she may initially prefer a cool temperature, a low humidity, a high airflow, and a darkened lighting level in the home when she returns. Once she becomes accustomed or acclimated to that level of exercise, however, such conditions may no longer be needed for her comfort. In another example, as users advance in age they may prefer warmer temperatures in the home (e.g., due to reduced blood circulation) than they did in their younger years.

Embodiments of the present disclosure can allow for preferences to adapt to changes in location and/or changes to users themselves. In some embodiments, such adaptation can be carried out responsive to user inputs. In some embodiments, such adaptation can be carried out automatically (e.g., without user input). In some embodiments, such adaptation can be carried out based on input(s) from devices that determine physical aspects of the person themselves (e.g., a wearable device).

Providing comfort settings can include modifying (e.g., changing) an operation, state, and/or mode of a connected device. For example, modification can include activating or deactivating a device, adjusting a device, alternating between device modes, etc.

As referred to herein, "connected devices" include "smart" devices, devices of a Building Management System and/or devices capable of joining a system or network to provide one or more aspects of comfort in a structure. Connected devices can include devices configured to provide a particular temperature, humidity, airflow, and/or lighting level, among other aspects of comfort. For example, connected devices can include thermostats, air conditioners, furnaces, humidifiers, fans, windows, window shades, lights, fireplaces, sound systems, displays, etc.

Connected devices can also include sensing devices (sensors) to determine temperature, humidity, airflow, and/or lighting level, among other aspects of comfort. For example, connected devices can include motion sensors, sound sensors, temperature sensors, light sensors, etc.

Embodiments of the present disclosure can receive information determined by such sensors in order to ensure that a desired comfort preference is being provided, or for use in determining how to provide the comfort preference. In some embodiments, such information can be received from outside sources (e.g., a cloud-based service). For example, weather conditions including temperature, cloud cover, wind speed, wind direction, rain, fog, humidity, sun intensity, sun angle, etc. can be received and used to determine how to provide a comfort preference.

Embodiments of the present disclosure can determine and/or receive these preferences, store them in memory, and use them to provide a comfort preference when the user is in a particular location in a structure at a particular time. In some embodiments, the preferences can be determined based on tracking (e.g., learning) behavior of the user over a period of time. Tracking can include tracking user (e.g., device) location in conjunction with user interaction(s) with connected devices in the structure. Additionally, preferences can be received directly through user input (e.g., into the mobile device). In some embodiments, the user can select a particular preference from a list of preferences, causing the operations of a plurality of connected devices to be modified.

Embodiments of the present disclosure can store preferences associated with a plurality of users. It is to be understood that each user may find comfort with a unique set of comfort settings. In instances where multiple users may share a location, embodiments of the present disclosure can allow for hybridizing (e.g., averaging and/or otherwise adapting to a difference in) their comfort settings and/or prioritizing one user's comfort over another.

Some embodiments can run as a background service on the device and can establish wireless communication between the mobile device and location beacons dispersed throughout a structure in order to determine the device's location within the structure. In other embodiments, the device's location can be determined using a location functionality associated with the mobile device (e.g., Wi-Fi, GPS, etc.), for instance. Accordingly, personalized interactions with connected devices can be made by the mobile device specifically tailored to the comfort preferences of the user of the device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of blocks" can refer to one or more blocks.

FIG. 1 illustrates a system 100 for providing integrative comfort in a structure 108 in accordance with one or more embodiments of the present disclosure. As shown in FIG. 1, system 100 includes a mobile device 102 and a structure 108. The mobile device 102 can be a phone (e.g., a smart phone), a tablet, a personal digital assistant (PDA), a wrist-worn device, among other types of computing devices.

As shown in FIG. 1, mobile device 102 includes a memory 104 and a processor 106 coupled to memory 104. Memory 104 can be any type of storage medium that can be accessed by processor 106 to perform various examples of the present disclosure. For example, memory 104 can be a non-transitory computer readable medium having computer readable instructions (e.g., computer program instructions) stored thereon that are executable by processor 106 to provide integrative comfort in the structure 108 in accordance with one or more embodiments of the present disclosure. The computer readable instructions can be and/or be a portion of an application and/or program (e.g., a mobile application) which may be downloadable over the internet, for instance. The application can allow the assessment of comfort and/or the manipulation of connected devices to achieve target comfort as described herein, for instance.

Memory 104 can be volatile or nonvolatile memory. Memory 104 can also be removable (e.g., portable) memory, or non-removable (e.g., internal) memory. For example, memory 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 104 is illustrated as being located in mobile device 102, embodiments of the present disclosure are not so limited. For example, memory 104 can also be located internal to another computing resource (e.g., enabling computer readable instructions to be downloaded over the Internet or another wired or wireless connection).

As shown in FIG. 1, the memory 104 can include a comfort preference 105 (discussed further below). Although one comfort preference is shown, embodiments of the present disclosure can include a plurality of comfort preferences.

The structure 108 can be a home, a hotel, a motel, and/or an office building, among other types of structures. Although one structure is shown, embodiments of the present disclosure can include a plurality of structures.

The structure 108 can include a location beacon 110-1 and a location beacon 110-2 (sometimes generally referred to as "location beacons 110"). Although two location beacons are shown, embodiments of the present disclosure can include more or fewer location beacons. The location beacons 110 can be transmitters configured to wirelessly communicate with the mobile device 102 such as Bluetooth low energy (BLE) beacons, for instance, though embodiments of the present disclosure are not so limited. For instance, the location beacons 110 can be WiFi beacons and/or femtocells, among other beacons. The location beacons 110 can be coin cell devices, USB sticks, dongles, and/or other form factors. The location beacons 110 can be a portion of an indoor proximity system, for instance. Each of the location beacons 110 can be located at a respective location (e.g., position) in the structure 108.

The location beacons 110 can allow mobile device 102 to determine its location (e.g., position) within the structure 108. The location beacons 110 can be used to determine a particular room of the structure 108 the mobile device 102 is in based on a wireless communication between the mobile device 102 and at least one location beacon 110 within the structure 108. Where "room" is used in examples discussed herein, it is to be understood that other areas are included. For example, a user can define a custom polygon in the structure 112 and the location beacons can determine when a user has entered the polygon.

For example, the location beacons 110 can each transmit a universally unique identifier recognized by the mobile device 102. When the mobile device 102 receives a transmission from one or more of location beacons 110, it can determine its position with respect to the structure 108. In some embodiments, the mobile device 102 can triangulate, trilaterate and/or multilaterate its location using the received transmissions from a plurality of the location beacons 110. The mobile device 102 can determine when a user associated with (e.g., carrying) the mobile device has entered, exited, or lingered in a portion of the structure (e.g., a room of the structure 108). In some embodiments, a portion of a structure can refer to a room, a floor, a wing, or some other subset of the structure. In some embodiments, the portion can refer to the structure as a whole.

Though the location beacons 110 are shown in FIG. 1, embodiments of the present disclosure can utilize additional or alternative means of determining a location of the mobile device 102 within the structure 108. For instance, the structure 108 can include a number of occupancy sensors, motion sensors, presence sensors, etc. that may improve the estimation of the position of the mobile device with respect to the structure.

For the purposes of illustration, an example is discussed herein where location beacon 110-1 is located in a first room of the structure 108 and location beacon 110-2 is located in a second room of the structure 108. It is to be understood that embodiments of the present disclosure are not limited to such a scenario.

The structure 108 can include a connected device (e.g., connected device) 112-1, a connected device 112-2, a connected device 112-3, and a connected device 112-4 (sometimes generally referred to as "system devices 112"). Although four connected devices are shown, embodiments of the present disclosure can include more or fewer connected devices. As previously discussed, connected devices 112 can include "smart" devices, devices of a Building Management System associated with the structure 108 and/or devices capable of joining a system or network. For example, connected devices can include sensors, controllers, lights, heating, ventilation and air conditioning (HVAC) system devices (e.g., air conditioners, furnaces, etc.), water system devices, humidifiers, fans, windows, lights, fireplaces, alarms, security devices, thermostats, shading devices, communication devices, sound systems, displays, appliances, etc.

For the purposes of illustration, and according to the example previously discussed, connected devices 112-1 and 112-3 are discussed as being located in the first room of the structure 108 (e.g., the same room as the location beacon 110-1) and connected devices 112-2 and 112-4 are located in the second room of the structure 108 (e.g., the same room as the location beacon 110-2). It is to be understood that embodiments of the present disclosure are not limited to such a scenario.

As previously discussed, embodiments of the present disclosure can track movements of the mobile device 102 (and by extension, the user associated with mobile device 102) throughout the structure 108. In order to determine and/or learn comfort preferences (e.g., one or more settings of one or more connected devices 112) some embodiments can correlate user interactions with connected devices 112 with determined locations and/or movements as well as their time(s) (e.g., time context(s)). In an example, it can be determined that the user typically turns the lights off in the living room and deactivates the fan as he leaves it on weeknights after 9:00 pm.

Such tracking can be carried out over a plurality of connected devices 112 over a period of time (e.g., a week, a month, a season, a year, etc.). In some embodiments the user can be prompted, via the mobile device 102, to input and/or select a comfort preference 105. In some embodiments, and as discussed in connection with FIG. 2, for instance, the user can select a comfort preference from a list of comfort preferences.

In some embodiments, the selection of the comfort preference 105 can be made responsive to the user's distance from a location within the structure being less than a particular threshold. Being less than such a threshold can include the user entering a room and/or zone associated with a particular location beacon (e.g., location beacon 110-1) and/or coming within a particular distance of the location beacon. In some embodiments, being less than the threshold can include the user coming within a particular distance of the structure 108. Coming within a particular instance can include the user entering a particular region and/or bounded geometry, for instance.

In an example, the user can define a comfort preference 105 for when the user returns from a workout where the preference includes the shades being drawn (if the sun is out), fan speed set to high, temperature at 63 degrees Fahrenheit, and humidity set to low. Embodiments of the present disclosure can determine the user has returned from the workout by tracking the user's location from the gym, or by directly measuring the user's heartrate and/or body temperature. In some embodiments, for instance, a particular comfort preference can be provided based on bodily condition. The provision of comfort preferences may take a particular amount of time depending on the nature of the preference(s). In some embodiments, comfort can be provided (e.g., the initiation of the provision of comfort) before the user arrives at the structure 108.

Additionally, comfort preferences can be determined based on local weather conditions affecting the structure 108. Accordingly, embodiments of the present disclosure can be in communication with various weather services and/or sources of local weather conditions. In an example, a comfort preference 105 associated with a period of inclement weather and/or cloud cover (e.g., blinds open) may differ from another comfort preference 105 associated with a sunny day (e.g., blinds closed). Depending on the preference selected and depending on weather and/or environmental conditions, one or more actuated windows may be opened or closed.

Weather conditions may be termed "uncontrolled conditions" in that they occur outside the scope of user control and/or intent. Uncontrolled conditions can occur outside the structure and/or inside the structure. For instance, if a comfort preference is being provided and weather patterns change, embodiments herein can react to such a change. For example, if the windows of the structure 108 are open to allow warm air to enter the structure 108, the onset of a sudden decrease in temperature or rainfall may cause the windows to close. Accordingly, operation states of devices can change in order for embodiments herein to continue to provide the comfort preference.

Uncontrolled conditions inside the structure 108 can include conditions caused by a user and/or conditions not caused by a user. For example, if a "normal" comfort preference is being provided (discussed below in connection with FIG. 2) and the user turns on the oven, embodiments of the present disclosure can recognize the activation of the oven and predict an effect the oven may have on the temperature of the kitchen. Accordingly, embodiments herein can activate a ceiling fan, for instance, to counteract the heating effect of the oven in order to maintain the comfort preference. Uncontrolled conditions may, in some cases, block the full achievement of one or more comfort preferences. In such cases, providing a comfort preference may include attempting to provide the comfort preference or providing an approximated (e.g., modified) comfort preference.

Once determined, comfort preferences can be stored in the memory 104 for subsequent access and/or retrieval. The comfort preferences can be stored in association with the user and/or the mobile device (e.g., via a device identifier). Embodiments of the present disclosure can retrieve a particular comfort preference 105 and provide the comfort preference(s) 105 when the user is in a particular location in the structure, at a particular time, and/or based on other contextual information. Embodiments can access a predefined comfort preference 105, stored in the memory 104, associated with a user of the mobile device 102 based on the particular room and the time context. Some embodiments can run as a background service on the mobile device 102 and can establish wireless communication between the mobile device 102 device and location beacons 110.

To provide comfort preferences, embodiments of the present disclosure can modify an operation of a plurality of the connected devices 112 in the structure 108 (e.g., while the device is in the room). In other words, embodiments can change a state of the connected devices 112 associated with the room from a first state to a second state. For example, modification can include activating or deactivating any of connected devices 112, adjusting (e.g., adjusting power, output, speed, etc.) any of connected devices 112, alternating between modes, such as energy efficiency mode (e.g., off) and/or comfort mode (e.g., on) of any of connected devices 112, opening or closing any of connected devices 112, etc.

Such modification can be responsive to a distance between the mobile device and the particular location being less than a particular threshold (as previously discussed). Additionally, such modification can be responsive to a particular time (e.g., time of day, day of week, month, season, etc.). In some embodiments, the user may be prompted, via the mobile device 102, for permission to modify an operation of at least one of the connected devices 112 of the structure 108. Such notification may be provided in instances where user action apparently contradicts a selected comfort preference. An example of such a prompt may indicate that the user has turned on the fireplace while a comfort preference of "icy" was in effect. The notification may ask the user if he intended to turn on the fireplace and/or if he desires to select a different comfort preference.

As previously discussed, comfort preferences can be stored for each of a plurality of users as each of the users may prefer different settings of the connected devices 112. In instances where multiple users may share a location (e.g., a structure, a zone, and/or a room), embodiments of the present disclosure can determine a comfort preference 105 based on a priority arrangement between the devices associated with the users. Some embodiments can allow for hybridizing (e.g., compromising) their comfort settings; some embodiments can allow for prioritizing one user's comfort over another.

For example, if two users are sharing a room where one user prefers a first temperature and airflow setting and the other user prefers a second temperature and airflow setting, some embodiments may modify one or more of the connected devices 112 to provide a third temperature and airflow setting that falls between the first and second settings. Some embodiments may hybridize the temperature settings and elect one of the airflow settings or vice versa. Given the same set of circumstances, some embodiments may grant priority to one of the two users and modify one or more of the connected devices 112 to provide the setting(s) preferred by that user. Priorities may be determined, set, and/or modified by a user having appropriate privileges (e.g., an owner and/or administrator of the structure 108), for instance.

In some embodiments, once determined and/or stored in memory, comfort preferences can be utilized for other purposes. For example, some embodiments may provide a recommendation associated with increasing efficient usage of energy in the structure 108 (e.g., reducing energy usage) by modifying a comfort preference 105 (e.g., increasing a temperature set point of a thermostat by one degree during the summer). The recommendation can include a potential monetary savings resulting from the modification. Accordingly, mobile devices in accordance with embodiments of the present disclosure can be in communication with various power providers and/or sources of local power cost information.

Additionally, some embodiments can include receiving an energy usage target (e.g., from the user and/or from an energy provider). Embodiments herein can provide the comfort preference while meeting the energy usage target.

Comfort preferences stored in the memory can be accessed and/or retrieved by a plurality of structures and/or devices of a plurality of structures. In an example, a user determines a comfort preference 105 associated with a temperature and lighting level in a hotel room. Embodiments of the present disclosure can retrieve and provide that comfort preference 105 in the event that the user stays in a different hotel (e.g., a different branch of a hotel chain). Accordingly, the user's comfort may be automatically maintained across various structures according to his preferences.

FIG. 2 illustrates a table 214 showing example comfort preferences and aspects thereof in accordance with one or more embodiments of the present disclosure. As shown in FIG. 2, the table 214 includes a plurality of selectable comfort preferences (referred to as "mode" in FIG. 2). As previously discussed, comfort preferences can include a plurality of aspects, which can be modified by one or more connected system devices.

For example, as shown in the table 214, the aspects of comfort preference can include temperature 220, humidity 224, airflow 226, and ambient light 228. The temperature 220 can be controlled by a thermostat, an air conditioner, a furnace, a fireplace, a window, and/or a window shade, among other devices. The humidity 224 can be controlled by a humidifier, a fan, and/or a window, among other devices. The airflow 226 can be controlled by a fan and/or a window, among other devices. The ambient light 228 can be controlled by a window, a window shade, and/or a light bulb, among other devices.

The table 214 illustrates a plurality of example modes 216 and the respective scenarios for which they may be applicable, though it is noted that such scenarios are not to be taken in a limiting sense. In some embodiments, comfort preferences can follow a nomenclature that is readily understandable and includes simple terms.

For instance, an "icy" mode may be selected (or automatically provided, as with any of the modes and/or preferences herein) when the user is coming home from a hard, hot workout. In order to provide comfort, the temperature 220 can be set (e.g., automatically set without user input) to cold (e.g., coldest temperature setting), the humidity 224 can be set to "desert" (e.g., lowest humidity setting), the airflow 226 can be set to "hurricane" (e.g., highest fan setting), and the ambient light 228 can be set to "dark" (e.g., lowest light setting). Depending on external conditions, providing the "icy" comfort setting (as well as any of the other settings shown in the table 216) can include opening or closing windows and/or window shades.

A "cool & crisp" mode may be selected when the user is coming home on a hot summer day, for instance. In order to provide comfort, the temperature 220 can be set to cool (e.g., a relatively low temperature setting), the humidity 224 can be set to dry, the airflow 226 can be set to breezy, and the ambient light 228 can be set to shady.

A "normal" mode may be selected when the user is gathering with friends and family, for instance. In order to provide comfort, the temperature 220 can be set to pleasant (e.g., a relatively medium temperature setting), the humidity 224 can be set to mild, the airflow 226 can be set to airy, and the ambient light 228 can be set to bright.

A "cozy" mode may be selected when the user is curled up for a movie, for instance. In order to provide comfort, the temperature 220 can be set to warm, the humidity 224 can be set to mild, the airflow 226 can be set to still (e.g., no airflow), and the ambient light 228 can be set to dark.

A "toasty" mode may be selected when the user is warming up on a cold day, for instance. In order to provide comfort, the temperature 220 can be set to warm, the humidity 224 can be set to humid, the airflow 226 can be set to still, and the ambient light 228 can be set to shady.

The modes illustrated in FIG. 2 are included as examples and are not to be taken in a limiting sense. Additionally, it is noted that in accordance with embodiments herein, the user can modify one or more aspects of the predefined modes illustrated in the table 214. For instance, the user can change the temperature 220 associated with the "cozy" mode from "warm" to "pleasant."

FIG. 3 illustrates an example display 330 of a mobile device 302 for providing integrative comfort in a structure in accordance with one or more embodiments of the present disclosure. The display 330 can be provided via a user interface of the mobile device 302, which may be analogous to the mobile device 102, previously described in connection with FIG. 1.

As shown in FIG. 3, a comfort preference can be selected from a list of comfort preferences. The Display 330 includes the comfort preferences "icy," "crisp & cool," "warm & cozy," and "toasty" previously discussed in connection with FIG. 2. In addition, comfort preferences between these preferences can be selected such that the user can be provided with more specific control over their comfort. The display 330 can incorporate a slider such that the comfort preferences are shown along a sliding scale. Accordingly, the user can select desired preferences and/or adjust intensity as desired. The display 330 can allow modification (e.g., customization) of predefined comfort preferences and/or the creation of new comfort preferences.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising:
prompting, via a computing device, a user to select a particular comfort preference from a plurality of predefined comfort preferences,
  wherein the plurality of predefined comfort preferences each including different predefined settings associated with a temperature, a humidity level, and at least one of an airflow level or a lighting level in a structure,
  wherein the prompting of the user comprises displaying the plurality of predefined comfort preferences that each include a respective temperature, humidity level, and at least one of a respective airflow level or a respective lighting level associated with each of the plurality of predefined comfort preferences, and
  wherein the respective temperature, humidity level, and at least one of the respective airflow level or the respective lighting level associated with each of the plurality of predefined comfort preferences is a predefined temperature, a predefined humidity level, and at least one of a predefined airflow level or a predefined lighting level associated with each of the plurality of predefined comfort preferences,
  wherein the plurality of predefined comfort preferences comprises at least a first comfort preference, a second comfort preference, and a third comfort preference,
    wherein the first comfort preference defines a low temperature, a low humidity, and at least one of a high airflow level or a low lighting level,
    wherein the second comfort preference defines a medium temperature, a medium humidity level, and at least one of a medium airflow level or a high lighting level, and
    wherein the third comfort preference defines a high temperature, a low humidity level, and at least one of a low airflow level or a low lighting level;
receiving, via the computing device, a single input from the user indicating the particular comfort preference,
  wherein the single input from the user selects the respective temperature, humidity level, and at least one of the respective airflow level or lighting level;
determining the particular comfort preference based on the single input,
  wherein the particular comfort preference including a first setting associated with the temperature in the structure, a second setting associated with the humidity level in the structure, and at least one of a third setting associated with the airflow level or a fourth setting associated with the lighting level,
    wherein the particular comfort preference is determined based on a selection, made with the single input using the computing device, of one of the plurality of predefined comfort preferences;
storing the particular comfort preference in a memory;
determining a location of the computing device within the structure relative to one or more location beacons within the structure; and
controlling operation of a plurality of connected devices without user input based on the first setting and the second setting of the particular comfort preference in a portion of the structure,
  wherein the controlling operation of the plurality of connected devices comprises controlling the operation of the plurality of connected devices without the user input based on at least the first setting and the second setting of the particular comfort preference in the location as determined and based on the determination that the user is in the location as determined.

2. The method of claim 1,
wherein the prompting of the user to select the particular comfort preference comprises prompting, via a phone, a tablet, or a wrist-worn device, of the user to select the particular comfort preference, and
wherein receiving the single input comprises the receiving of the single input via the phone, the tablet, or the wrist-worn device.

3. The method of claim 1, further comprising determining the particular comfort preference based on at least one adjustment made directly to at least one of the plurality of connected devices by the user.

4. The method of claim 1, wherein the plurality of connected devices in the structure includes two or more of a thermostat, an air conditioner, a furnace, a humidifier, a fan, a window shade, a window, a lighting device, and a fireplace.

5. The method of claim 1, further comprising determining an uncontrolled condition outside of the structure bearing on the particular comfort preference and modifying a respective operation of the plurality of connected devices in the structure to provide the particular comfort preference based on the uncontrolled condition outside of the structure.

6. The method of claim 5,
wherein the determining of the uncontrolled condition outside of the structure comprises determining an intensity of sunlight, and
wherein the modifying of the respective operation of the plurality of connected devices comprises closing shades in the structure in response to determining the intensity of sunlight.

7. The method of claim 1, further comprising determining an uncontrolled condition inside the structure and modifying a respective operation of the plurality of connected devices in the structure to provide the particular comfort preference based on the uncontrolled condition inside the structure.

8. The method of claim 1, wherein the prompting of the user to select the particular comfort preference comprises presenting the plurality of predefined comfort preferences including the first comfort preference and the second comfort preference.

9. The method of claim 1, further comprising:
determining that the user is in the portion of the structure,
  wherein the controlling operation of the plurality of connected devices comprises controlling operation of the plurality of connected devices without the user input based on at least the first setting and the second setting of the particular comfort preference in the portion of the structure and based on the determination that the user is in the portion of the structure.

10. The method of claim 1, wherein each comfort preference of the plurality of predefined comfort preferences further includes the fourth setting associated with the lighting level in the structure, and wherein the single input from the user selects the respective temperature, humidity level, and lighting level associated with the particular comfort preference.

11. A device comprising:
a memory; and
a processor coupled to the memory and configured to:
prompt a user to select a particular comfort preference from a plurality of predefined comfort preferences, wherein the plurality of predefined comfort preferences each including different predefined settings associated with a temperature, a humidity level, and at least one of an airflow level or a lighting level in a structure,
wherein to prompt the user, the processor is configured to display the plurality of predefined comfort preferences that each include a respective temperature, humidity level, and at least one of a respective airflow level or a respective lighting level associated with each of the plurality of predefined comfort preferences, and
wherein the respective temperature, humidity level, and at least one of the respective airflow level or the respective lighting level associated with each of the plurality of predefined comfort preferences is a predefined temperature, a predefined humidity level, and at least one of a predefined airflow level or a predefined lighting level associated with each of the plurality of predefined comfort preferences,
wherein the plurality of predefined comfort preferences comprises at least a first comfort preference, a second comfort preference, and a third comfort preference,
wherein the first comfort preference defines a low temperature, a low humidity, and at least one of a high airflow level or a low lighting level,
wherein the second comfort preference defines a medium temperature, a medium humidity level, and at least one of a medium airflow level or a high lighting level, and
wherein the third comfort preference defines a high temperature, a low humidity level, and at least one of a low airflow level or a low lighting level;
receive a single input from the user indicating the particular comfort preference,
wherein the single input from the user selects the respective temperature, humidity level, and at least one of the respective airflow level or the respective lighting level associated with the particular comfort preference;
determine the particular comfort preference based on the single input,
wherein the particular comfort preference including a first setting associated with the temperature in the structure, a second setting associated with the humidity level in the structure, and at least one of a third setting associated with the airflow level or a fourth setting associated with the lighting level;
store the particular comfort preference in the memory responsive to receiving a selection, made with the single input, of the particular comfort preference;
access the particular comfort preference from the memory;
determine a location of the device within the structure relative to one or more location beacons within the structure; and
control operation of a plurality of connected devices without user input based on the first setting and the second setting of the particular comfort preference in a portion of the structure,
wherein the controlling operation of the plurality of connected devices comprises controlling the operation of the plurality of connected devices without the user input based on at least the first setting and the second setting of the particular comfort preference in the location as determined and based on the determination that the user is in the location as determined.

12. The device of claim 11,
wherein to prompt the user to select the particular comfort preference, the processor is configured to prompt, via a phone, a tablet, or a wrist-worn device, the user to select the particular comfort preference, and
wherein to receive the single input, the processor is configured to receive the single input via the phone, the tablet, or the wrist-worn device.

13. The device of claim 11, wherein the processor is configured to:
determine an uncontrolled condition outside of the structure bearing on the particular comfort preference; and
modify the respective operation of the plurality of connected devices in the structure to provide the particular comfort preference based on the uncontrolled condition outside of the structure.

14. The device of claim 11, wherein to prompt the user to select the particular comfort preference, the processor is configured to present the plurality of predefined comfort preferences including the first comfort preference and the second comfort preference.

15. The device of claim 11, wherein the particular comfort preference further includes the fourth setting associated with the lighting level in the structure, and wherein the single input from the user selects the respective temperature, the respective humidity level, and the respective lighting level associated with the particular comfort preference.

16. The device of claim 11, wherein the processor is configured to determine whether the user is in the portion of the structure, and wherein to control operation of the plurality of connected devices, the processor is configured to control operation of the plurality of connected devices without user input based on at least the first setting and the second setting of the particular comfort preference in the portion of the structure and based on the determination that the user is in the portion of the structure.

17. The device of claim 11, wherein the fourth setting associated with the lighting level identifies a setting for one or more of a window, a window shade, or a light bulb.

18. A non-transitory computer-readable medium having instructions stored thereon which, when executed by a processor, cause the processor to:
prompt, via a computing device, a user to select a particular comfort preference from a list of comfort preferences,
wherein each comfort preference of the list of comfort preferences includes one or more other settings of different predefined settings associated with a temperature, a humidity level, and at least one of an airflow level or a lighting level in a structure,
wherein the instructions that cause the processor to prompt the user comprise instructions that cause the processor to display the list of comfort preferences that each include a respective temperature, a respective humidity level, and at least one of a respective airflow level or a respective lighting level associated with each comfort preference of the list of comfort preferences, and wherein the respective temperature, humidity level, and at least one of the respective airflow level or the respective lighting level associated with each comfort preference of the list of comfort preferences is a predefined temperature, a predefined humidity level, and at least one of a predefined airflow level or a predefined lighting level associated with each comfort preference of the list of comfort preferences, wherein the list of comfort preferences comprises at least a first comfort preference, a second comfort preference, and a third comfort preference, wherein the first comfort preference defines a low temperature, a low humidity, and at least one of a high airflow level or a low lighting level, wherein the second comfort preference defines a medium temperature, a medium humidity level, and at least one of a medium airflow level or a high lighting level, and wherein the third comfort preference defines a high temperature, a low humidity level, and at least one of a low airflow level or a low lighting level;

receive, via a single input made using the computing device, a selection of the particular comfort preference from the list of comfort preferences, wherein the single input from the user selects the respective temperature, humidity level, and at least one of the respective airflow level or the respective lighting level associated with the particular comfort preference, wherein the particular comfort preference includes a first setting associated with the temperature in the structure, a second setting associated with the humidity level in the structure, and at least one of a third setting associated with the airflow level or a fourth setting associated with the lighting level;

store the particular comfort preference in a memory;

determine a location of the computing device within the structure relative to one or more location beacons within the structure; and control operation of a plurality of connected devices in the structure without user input based on the first setting and the second setting of the particular comfort preference, wherein the controlling operation of the plurality of connected devices comprises controlling the operation of the plurality of connected devices without the user input based on at least the first setting and the second setting of the particular comfort preference in the location as determined and based on the determination that the user is in the location as determined.

19. The non-transitory computer-readable medium of claim 18, wherein the instructions include instructions to cause at least one of the connected devices in the structure to enter a different operation state to continue to provide the particular comfort preference responsive to a change in a condition inside or outside the structure.

20. The non-transitory computer-readable medium of claim 18, wherein the instructions to prompt the user to select the particular comfort preference include instructions to present the plurality of predefined comfort preferences including the first comfort preference and the second comfort preference.

* * * * *